US012742027B2

(12) United States Patent
Kim et al.

(10) Patent No.: US 12,742,027 B2
(45) Date of Patent: Sep. 22, 2026

(54) METHOD FOR PREPARING POLYMER POLYOL

(71) Applicant: KOREA KUMHO PETROCHEMICAL CO., LTD., Seoul (KR)

(72) Inventors: Gi Jung Kim, Pyeongtaek-si (KR); Seulgi Kim, Seongnam-si (KR); Jinwoo Park, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 659 days.

(21) Appl. No.: 18/033,227

(22) PCT Filed: Oct. 20, 2021

(86) PCT No.: PCT/KR2021/014639
§ 371 (c)(1),
(2) Date: Apr. 21, 2023

(87) PCT Pub. No.: WO2022/086148
PCT Pub. Date: Apr. 28, 2022

(65) Prior Publication Data

US 2023/0391908 A1 Dec. 7, 2023

(30) Foreign Application Priority Data

Oct. 23, 2020 (KR) ........................ 10-2020-0138126

(51) Int. Cl.
*C08F 212/10* (2006.01)
*C08F 6/10* (2006.01)
*C08F 8/00* (2006.01)

(52) U.S. Cl.
CPC .............. *C08F 212/10* (2013.01); *C08F 6/10* (2013.01); *C08F 8/00* (2013.01)

(58) Field of Classification Search
CPC ........... C08F 2/001; C08F 2/04; C08F 212/10
See application file for complete search history.

(56) References Cited

U.S. PATENT DOCUMENTS 5,814,699 A * 9/1998 Kratz .................. C08G 18/635 525/404
2014/0058037 A1* 2/2014 Petton ..................... C08L 71/02 524/761
2019/0270836 A1* 9/2019 Kim .................. C08G 18/0871

FOREIGN PATENT DOCUMENTS

| | | | |
|---|---|---|---|
| KR | 10-2002-0081412 | A | 10/2002 |
| KR | 10-0433147 | B1 | 9/2004 |
| KR | 10-2010-0027694 | A | 3/2010 |
| KR | 10-1997463 | B1 | 7/2019 |
| KR | 10-1998849 | B1 | 7/2019 |

OTHER PUBLICATIONS

International Search Report for PCT/KR2021/014639 dated Feb. 16, 2022 (PCT/ISA/210).

* cited by examiner

*Primary Examiner* — Robert C Boyle
(74) *Attorney, Agent, or Firm* — Sughrue Mion, PLLC

(57) ABSTRACT

Disclosed is a method for preparing polymer polyol comprising the steps of: (a) polymerizing polyol and aromatic vinyl monomer in the presence of an organic diluting agent; (b) additionally inputting and polymerizing polyol, aromatic vinyl monomer and unsaturated nitrile monomer in the product of step (a); and (c) removing the organic diluting agent from the product of step (b), wherein the organic diluting agent is compatible with the polymer of the aromatic vinyl monomer.

12 Claims, No Drawings

METHOD FOR PREPARING POLYMER POLYOL

CROSS REFERENCE TO RELATED APPLICATIONS

This application is a National Stage of International Application No. PCT/KR2021/014639 filed Oct. 20, 2021, claiming priority based on Korean Patent Application No. 10-2020-0138126 filed Oct. 23, 2020, the entire disclosures of which are incorporated herein by reference.

TECHNICAL FIELD

The present invention relates to a method of preparing a polymer polyol.

BACKGROUND ART

Polymer polyols (POPs) are used to enhance the hardness of polyurethane foam, and are products in which solid polymer particles are dispersed in a liquid base polyol. Generally, as the solid particles dispersed in the polymer polyol, a styrene-acrylonitrile (SAN) copolymer is used, and it serves as a supporter inside a urethane cell structure during the preparation of polyurethane foam to impart an effect of maintaining the elasticity of the foam and increasing the hardness.

Due to such a hardness improvement effect, polymer polyols are widely used also in urethane foam products for mold, other than slabs. Recently, in the urethane foam market, a demand for low-density, high-hardness products with high hardness even at a low density is increasing. To satisfy the low density and high hardness characteristics, a high solid content is required for a polymer polyol product. However, when the content of solid contents in a polymer polyol product is increased, a rapid increase in viscosity and aggregation occurs due to a decrease in dispersion stability between particles, and it is known that it is very difficult to increase a solid content while minimizing these problems.

When the proportion of SAN particles dispersed in the polymer polyol increases, the distance between the dispersed particles becomes smaller, and accordingly, collisions increase, so the dispersion stability between particles rapidly decreases over the solid content threshold, resulting in aggregation. Particularly, when a polymer polyol is prepared by directly dispersing powder-type SAN particles in a base polyol, since aggregation proceeds more rapidly due to an increase in content of solid contents, a method of directly polymerizing and forming a SAN polymer in a polyol has been performed.

At the beginning of polymer polyol preparation, technology of seed polymerization of inputting seed particles to which a macromer imparting a dispersion stabilization effect is grafted in advance was attempted. The seed particles input at the beginning of the preparation process served as a polymer stabilizer providing a buffering effect between SAN particles formed later based on high dispersion stability, so it was possible to prepare a polymer polyol with a higher solid content than a conventional preparation method. However, there is a problem in that it is difficult to stably prepare a polymer polyol with an ultra-high solid content of 50% or more.

DISCLOSURE

Technical Problem

The present invention is directed to providing a method of stably and easily preparing a high-solid-content polymer polyol.

Technical Solution

One aspect of the specification provides a method of preparing a polymer polyol, which includes: (a) polymerizing an aromatic vinyl monomer in the presence of an organic diluent and a polyol; (b) additionally inputting a polyol, an aromatic vinyl monomer, and an unsaturated nitrile monomer to the product of (a) and performing polymerization; and (c) removing the organic diluent from the product of (b), wherein the organic diluent is compatible with an aromatic vinyl polymer.

In one embodiment, the organic diluent may be at least one selected from the group consisting of n-octane, n-dodecane, cyclohexane, methylcyclohexane, benzene, toluene, naphthalene, styrene, o-xylene, ethylbenzene, p-diethylbenzene, chloromethane, methylenechloride, 1,1-dichloroethylene, ethylenedichloride, chloroform, 1,1-dichloroethane, trichloroethylene, carbontetrachloride, chlorobenzene, o-dichlorobenzene, tetrahydrofuran, 1,4-dioxane, dibenzylether, acetone, methylethylketone, cyclohexanone, diethylketone, acetophenone, methylisobutylketone, methylisoamylketone, isophorone, diisobutylketone, methylacetate, ethylformate, propylene-1,2-carbonate, ethylacetate, diethylcarbonate, n-butylacetate, 2-ethoxyethyl acetate, isoamylacetate, 2-nitropropane, nitrobenzene, pyridine, morpholine, aniline, N-methyl-2-pyrrolidone, cyclohexylamine, quinoline, N,N-dimethylformamide, carbon disulfide, dimethyl sulfoxide, ethane thiol, ethanol, allyl alcohol, 1-propanol, 2-propanol, 1-butanol, 2-butanol, benzyl alcohol, cyclohexanol, diacetone alcohol, ethylene glycol monoethyl ether, diethylene glycol monomethyl ether, diethylene glycol monoethyl ether, ethylene glycol monobutyl ether, diethylene glycol monobutyl ether, 1-decanol, benzoic acid, stearic acid, phenol, resorcinol, m-cresol, methyl salicylate, ethylene glycol, glycerol, and propylene glycol.

In one embodiment, the polyol may have a weight average molecular weight of 1,000 to 6,000 g/mol.

In one embodiment, the polyol may have a hydroxyl value (OHV) of 30 to 60 mgKOH/g.

In one embodiment, the aromatic vinyl monomer may be at least one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexyl naphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, and halogenated styrene.

In one embodiment, the unsaturated nitrile monomer may be at least one selected from the group consisting of acrylonitrile, methacrylonitrile, ethacrylonitrile, phenylacrylonitrile, and α-chloroacrylonitrile.

In one embodiment, in (a), the weight ratio of the polyol and the aromatic vinyl monomer may be 100:25 to 50.

In one embodiment, in (a), the weight ratio of the organic diluent and the aromatic vinyl monomer may be 100:15 to 120.

In one embodiment, the weight ratio of the polyol of (a) and the additionally input polyol of (b) may be 100:100 to 500.

In one embodiment, the weight ratio of the aromatic vinyl monomer of (a) and the total sum of the monomers additionally input in (b) may be 100:100 to 1,500.

In one embodiment, the content of solid contents in the prepared polymer polyol may be 55 wt % or more, and a viscosity (at 25° C.) may be 15,000 to 55,000 cps.

In one embodiment, (a) to (c) may be performed by a one-pot process.

Advantageous Effect

According to one aspect, a method of stably and easily preparing a high-solid-content polymer polyol can be provided.

It should be understood that the effect of the specification is not limited to the above-described effects, and includes all effects that can be deduced from the configuration described in the detailed description or claims of the specification.

MODES OF THE INVENTION

Hereinafter, the specification will be described in detail with reference to the accompanying drawings. However, the details of the specification may be implemented in a variety of different forms, and are not limited to the embodiments described herein.

Throughout the specification, when a part is "connected" with another part, it means that the one part is "directly connected" or "indirectly connected" with a third member therebetween. In addition, when a certain part "includes" a certain component, it means that, unless particularly stated otherwise, another component may be further included, rather than excluding the other component.

When ranges of numerical values are set forth herein, unless the specific range is stated otherwise, the values have precision of significant figures provided in accordance with the standard rule in chemistry for significant figures. For example, the number 10 includes the range of 5.0 to 14.9, and the number 10.0 includes the range of 9.50 to 10.49.

The "polyurethane" used herein is a polymer material having a large amount of urethane (—NHCOO) bonds, and is used by being formed and processed in the form of a foam, which is a honeycomb-shaped light material generally through a polymer reaction that generates bubbles. The "polyurethane foam" is usually divided into flexible foam, rigid foam, or semi-rigid foam.

The "polymer polyol (POP)" used herein is also called a copolymer polyol (CPP) and refers to a product in which particulated organic/inorganic materials are dispersed in a liquid base polyol at a predetermined content. Generally, POP is widely used in various fields including sheets, bedding, and automobile parts to improve the hardness and air permeability of flexible and semi-rigid polyurethane foams.

The "macromer" used herein is also called a macromonomer, and as a macro molecule with a reactive terminal group, it can improve polymerization stability since introduced as a monomer in a polymer chain. For example, polyols containing an ethylenically unsaturated functional group may be used as a macromer.

Method of Preparing Polymer Polyol

A method of preparing a polymer polyol according to one aspect may include (a) polymerizing an aromatic vinyl monomer in the presence of an organic diluent and a polyol; (b) additionally inputting a polyol, an aromatic vinyl monomer, and an unsaturated nitrile monomer to the product of (a) and performing polymerization; and (c) removing the organic diluent from the product of (b), wherein the organic diluent is compatible with an aromatic vinyl polymer.

The preparation method is a soluble seed polymerization method different from conventional seed polymerization, and is able to stably and simply prepare a high-solid-content polymer polyol.

In (a), in the presence of the organic diluent and the polyol, an aromatic vinyl monomer is independently polymerized, and one that can dissolve an aromatic vinyl polymer polymerized from an aromatic vinyl monomer may be used as the organic diluent, and thus the aromatic vinyl polymer may be dissolved in the form of a polymer chain in an organic diluent and a polymer without being particulated in a solid phase.

The process of (a) may be performed at 100 to 150° C., for example, 100° C., 105° C., 110° C., 115° C., 120° C., 125° C., 130° C., 135° C., 140° C., 145° C., 150° C., or a temperature in the range between two values thereof for 0.1 to 3 hours, for example, 0.1 hours, 0.5 hours, 1 hour, 1.5 hours, 2 hours, 2.5 hours, 3 hours, or an hour in the range between two values thereof. Since the aromatic vinyl polymer may be dissolved in a mixture of an organic diluent and a polyol under a high temperature condition, (a) and (b) may maintain the temperature and continuously proceed.

The organic diluent may be at least one selected from the group consisting of n-octane, n-dodecane, cyclohexane, methylcyclohexane, benzene, toluene, naphthalene, styrene, o-xylene, ethylbenzene, p-diethylbenzene, chloromethane, methylenechloride, 1,1-dichloroethylene, ethylenedichloride, chloroform, 1,1-dichloroethane, trichloroethylene, carbontetrachloride, chlorobenzene, o-dichlorobenzene, tetrahydrofuran, 1,4-dioxane, dibenzylether, acetone, methylethylketone, cyclohexanone, diethylketone, acetophenone, methylisobutylketone, methylisoamylketone, isophorone, diisobutylketone, methylacetate, ethylformate, propylene-1,2-carbonate, ethylacetate, diethylcarbonate, n-butylacetate, 2-ethoxyethyl acetate, isoamylacetate, 2-nitropropane, nitrobenzene, pyridine, morpholine, aniline, N-methyl-2-pyrrolidone, cyclohexylamine, quinoline, N,N-dimethylformamide, carbon disulfide, dimethyl sulfoxide, ethane thiol, ethanol, allyl alcohol, 1-propanol, 2-propanol, 1-butanol, 2-butanol, benzyl alcohol, cyclohexanol, diacetone alcohol, ethylene glycol monoethyl ether, diethylene glycol monomethyl ether, diethylene glycol monoethyl ether, ethylene glycol monobutyl ether, diethylene glycol monobutyl ether, 1-decanol, benzoic acid, stearic acid, phenol, resorcinol, m-cresol, methyl salicylate, ethylene glycol, glycerol, and propylene glycol, but the specification is not limited thereto.

The polyol may have a weight average molecular weight of 1,000 to 6,000 g/mol, for example, 1,000 g/mol, 1,500 g/mol, 2,000 g/mol, 2,500 g/mol, 3,000 g/mol, 3,500 g/mol, 4,000 g/mol, 4,500 g/mol, 5,000 g/mol, 5,500 g/mol, 6,000 g/mol, or a temperature in the range between two values thereof, but the specification is not limited thereto. When the weight average molecular weight of the polyol is excessively low, mechanical properties including the hardness of the final product may be degraded, and when the weight average molecular weight of the polyol is excessively high, aggregation may occur, or a viscosity may excessively increase, thereby degrading processability.

The polyol may have a hydroxyl value (OHV) of 30 to 60 mgKOH/g, for example, 30 mgKOH/g, 35 mgKOH/g, 40 mgKOH/g, 45 mgKOH/g, 50 mgKOH/g, 55 mgKOH/g, 60 mgKOH/g, or a value in the range between two values thereof, but the specification is not limited thereto. The OHV is the weight of potassium hydroxide required to neutralize acetic acid binding to an acetyl compound obtained from 1 g of the polyol. The OHV may indicate the content of a hydroxyl group in the polyol, and may determine a ratio of the polyol in the polymerization of a polyurethane.

The viscosity of the polyether polyol may be 150 to 700 cps, for example, 150 cps, 200 cps, 250 cps, 300 cps, 350 cps, 400 cps, 450 cps, 500 cps, 550 cps, 600 cps, 650 cps, 700 cps, or a value in the range between two values thereof. When the viscosity is less than 150 cps, the mechanical properties and endurance of the polyurethane foam may decrease, and when the viscosity is more than 700 cps, the viscosity of the polyurethane may be excessively increased, and thus processability may be deteriorated.

The aromatic vinyl monomer may be at least one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexyl naphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, and halogenated styrene, but the specification is not limited thereto.

In (a), as a homopolymer seed may be prepared by independently polymerizing an aromatic vinyl monomer, a polymer in the initial polymerization step may be excluded from a solid content by keeping it dissolved in the organic diluent and the polyol, and therefore, aggregation may be prevented by preparing a polymer polyol under the condition of a lower content of solid contents than an actual polymerization rate.

In (a), in addition to the organic diluent, the polyol and the aromatic vinyl monomer, a conventional macromer polymerization stabilizer, which imparts a dispersion stabilization effect, and a radical polymerization initiator may be further included.

The polymerization initiator may be at least one selected from the group consisting of azobisisobutyronitrile, 4,4'-azobis(4-cyanovaleric acid), 1,1'-azobis(cyclohexanecarbonitrile), benzoyl peroxide, 1,1-bis(tert-butylperoxy)-3,3,5-trimethylcyclohexane, cyclohexanone peroxide, lauroyl peroxide, and potassium persulfate, but the specification is not limited thereto.

In (a), based on 100 parts by weight of the polyol, the content of the aromatic vinyl monomer may be 25 to 50 parts by weight, for example, 25 parts by weight, 30 parts by weight, 35 parts by weight, 40 parts by weight, 45 parts by weight, 50 parts by weight, or a value in the range between two values thereof. When the content of the aromatic vinyl monomer relative to the polyol is out of the above range, aggregation may occur, or the mechanical properties of the final product may be degraded.

In (a), based on 100 parts by weight of the organic diluent, the content of the aromatic vinyl monomer may be 15 to 120 parts by weight, for example, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, 80 parts by weight, 85 parts by weight, 90 parts by weight, 95 parts by weight, 100 parts by weight, 105 parts by weight, 110 parts by weight, 115 parts by weight, 120 parts by weight, or a value in a range between two values thereof. When the content of the aromatic vinyl monomer relative to the organic diluent is out of the above range, the aggregation of an aromatic vinyl polymer may occur, or excessive energy and costs may be consumed to remove the organic diluent in (c).

In (b), a polyol, an aromatic vinyl monomer and an unsaturated nitrile monomer may be further added to the product of (a), and polymerization may be performed, and to keep the aromatic vinyl polymer being dissolved, this process may be performed under the same reaction temperature condition of (a) described above for 0.1 to 10 hours, for example, 0.1 hours, 0.5 hours, 1.0 hour, 1.5 hours, 2.0 hours, 2.5 hours, 3.0 hours, 3.5 hours, 4.0 hours, 4.5 hours, 5.0 hours, 5.5 hours, 6.0 hours, 6.5 hours, 7.0 hours, 7.5 hours, 8.0 hours, 8.5 hours, 9.0 hours, 9.5 hours, 10.0 hours, or a time in the range between two values thereof.

The unsaturated nitrile monomer may be at least one selected from the group consisting of acrylonitrile, methacrylonitrile, ethacrylonitrile, phenylacrylonitrile, and α-chloracrylonitrile, but the specification is not limited thereto.

The additional input of (b) may be performed by pre-mixing the polyol, the aromatic vinyl monomer, the unsaturated nitrile monomer, and the radical polymerization initiator, and continuously inputting the resulting mixture to the product of (a).

After (b), the reaction temperature may increase by 5 to 15° C., and aging may be performed for 0.5 to 3 hours, thereby improving the stability of the polymer.

Based on the 100 parts by weight of the polymer of (a), the content of the polyol additionally input in (b) may be 100 to 500 parts by weight, for example, 100 parts by weight, 110 parts by weight, 120 parts by weight, 130 parts by weight, 140 parts by weight, 150 parts by weight, 160 parts by weight, 170 parts by weight, 180 parts by weight, 190 parts by weight, 200 parts by weight, 210 parts by weight, 220 parts by weight, 230 parts by weight, 240 parts by weight, 250 parts by weight, 260 parts by weight, 270 parts by weight, 280 parts by weight, 290 parts by weight, 300 parts by weight, 310 parts by weight, 320 parts by weight, 330 parts by weight, 340 parts by weight, 350 parts by weight, 360 parts by weight, 370 parts by weight, 380 parts by weight, 390 parts by weight, 400 parts by weight, 410 parts by weight, 420 parts by weight, 430 parts by weight, 440 parts by weight, 450 parts by weight, 460 parts by weight, 470 parts by weight, 480 parts by weight, 490 parts by weight, 500 parts by weight, or a value in the range between two values thereof. When the proportions of the polymers in (a) and (b) are out of the above ranges, the diameter of particles dispersed in the polymer polyol may not be uniform, qualities may deteriorate, or the qualities may be degraded due to the generation of a soluble oligomer.

Based on 100 parts by weight of the aromatic vinyl monomer of (a), the total sum of the monomers additionally input in (b) may be 100 to 1,500 parts by weight, for example, 100 parts by weight, 110 parts by weight, 120 parts by weight, 130 parts by weight, 140 parts by weight, 150 parts by weight, 160 parts by weight, 170 parts by weight, 180 parts by weight, 190 parts by weight, 200 parts by weight, 210 parts by weight, 220 parts by weight, 230 parts by weight, 240 parts by weight, 250 parts by weight, 260 parts by weight, 270 parts by weight, 280 parts by weight, 290 parts by weight, 300 parts by weight, 310 parts by weight, 320 parts by weight, 330 parts by weight, 340 parts by weight, 350 parts by weight, 360 parts by weight, 370 parts by weight, 380 parts by weight, 390 parts by weight, 400 parts by weight, 410 parts by weight, 420 parts by weight, 430 parts by weight, 440 parts by weight, 450 parts by weight, 460 parts by weight, 470 parts by weight, 480 parts by weight, 490 parts by weight, 500 parts by weight, 600 parts by weight, 610 parts by weight, 620 parts by weight, 630 parts by weight, 640 parts by weight, 650 parts by weight, 660 parts by weight, 670 parts by weight, 680 parts by weight, 690 parts by weight, 700 parts by weight, 710 parts by weight, 720 parts by weight, 730 parts by weight, 740 parts by weight, 750 parts by weight, 760 parts by weight, 770 parts by weight, 780 parts by weight, 790 parts by weight, 800 parts by weight, 810 parts by weight, 820 parts by weight, 830 parts by weight, 840 parts by weight, 850 parts by weight, 860 parts by weight, 870 parts by weight, 880 parts by weight, 890 parts by weight, 900 parts by weight, 910 parts by weight, 920 parts by weight, 930 parts by weight, 940 parts by weight, 950 parts by weight, 960 parts by weight, 970 parts by weight, 980 parts by weight, 990 parts by weight, 1,000 parts by weight, 1,010 parts by weight, 1,020 parts by weight, 1,030 parts by weight, 1,040 parts by weight, 1,050 parts by weight, 1,060 parts by weight, 1,070 parts by weight, 1,080 parts by weight, 1,090 parts by weight, 1,100 parts by weight, 1,110 parts by weight, 1,120 parts by weight, 1,130 parts by weight, 1,140 parts by weight, 1,150 parts by weight, 1,160 parts by weight, 1,170 parts by weight, 1,180 parts by weight, 1,190 parts by weight, 1,200 parts by weight, 1,210 parts by weight, 1,220 parts by weight, 1,230 parts by weight, 1,240 parts by weight, 1,250 parts by weight, 1,260 parts by weight, 1,270 parts by weight, 280 parts by weight, 1,290 parts by weight, 1,300 parts by weight, 1,310 parts by weight, 1,320 parts by weight, 1,330 parts by weight, 1,340 parts by weight, 1,350 parts by weight, 1,360 parts by weight, 1,370 parts by weight, 1,380 parts by weight, 1,390 parts by weight, 1,400 parts by weight, 1,410 parts by weight, 1,420 parts by weight, 1,430 parts by weight, 1,440 parts by weight, 1,450 parts by weight, 1,460 parts by weight, 1,470 parts by weight, 1,480 parts by weight, 1,490 parts by weight, 1,500 parts by weight, or a value in the range between two values thereof. The total sum of the monomers input in (b) refers to a weight ratio of the total sum of the aromatic vinyl monomer and the unsaturated nitrile monomer, and when the weight ratio of the monomers of (a) and (b) is out of the above range, aggregation may occur or a viscosity may abnormally increase during the seed preparation.

In (c), the organic diluent used as a solvent is removed, and any of the known solvent removal processes including degassing and drying, which less affects physical properties of the polymer polyol itself, may be applied. After (c), the initial polymerization aromatic vinyl polymer dissolved in the form of a polymer chain may be precipitated as solid particles to stably increase the content of solid contents in the final product.

The content of solid contents in the prepared polymer polyol may be 55 wt % or more, for example, 55 wt %, 56 wt %, 57 wt %, 58 wt %, 59 wt %, 60 wt %, or a value in the range between two values thereof or 60 wt % or more, and a viscosity (at 25° C.) of the prepared polymer polyol may be 15,000 to 55,000 cps, for example, 15,000 cps, 16,000 cps, 17,000 cps, 18,000 cps, 19,000 cps, 20,000 cps, 21,000 cps, 22,000 cps, 23,000 cps, 24,000 cps, 25,000 cps, 26,000 cps, 27,000 cps, 28,000 cps, 29,000 cps, 30,000 cps, 31,000 cps, 32,000 cps, 33,000 cps, 34,000 cps, 35,000 cps, 36,000 cps, 37,000 cps, 38,000 cps, 39,000 cps, 40,000 cps, 41,000 cps, 42,000 cps, 43,000 cps, 44,000 cps, 45,000 cps, 46,000 cps, 47,000 cps, 48,000 cps, 49,000 cps, 50,000 cps, 51,000 cps, 52,000 cps, 53,000 cps, 54,000 cps, 55,000 cps, or a value in the range between two values thereof. When the process is performed using an organic diluent compatible with the aromatic vinyl polymer, a polymer polyol having a high content of solid contents may be prepared without aggregation by temporarily reducing the content of solid contents during polymerization.

(a) to (c) may be accomplished by a one-pot process. According to the application of such a one-pot process, the precipitation of the seed prepared in (a) may be prevented to prepare a polymer polyol, and a solvent may be removed from the polymer polyol to make the polymer polyol solid particles, thereby simply and stably realizing an ultra-high-solid-content polymer polyol (ultra-high solid POP).

Hereinafter, examples of the specification will be described in further detail. However, the following experimental results are only representative experimental results among the above embodiments, and cannot be interpreted as the scope and content of the specification are reduced or limited by the examples. Effects of the various embodiments of the specification that are not explicitly presented below are specifically described in the corresponding parts.

SAMPLES

- Base polyol: polyether polyol
- Polymerizable unsaturated monomer: styrene (SM), acrylonitrile (AN)
- Polymerization stabilizer: macromer-type polymerization stabilizer
- Polymerization initiator: azobisisobutyronitrile, 2,2'-azobis(2-methylpropionitrile)
- Organic diluent: ethylbenzene (EB), toluene (TOL), isopropyl alcohol (IPA)

Example 1

(1) Formation of Soluble Seed 90 parts by weight of styrene, which is a polymerizable unsaturated monomer, and 0.9 parts by weight of azobisisobutyronitrile, which is a polymerization initiator, were mixed and completely dissolved at room temperature in a 4 L reactor equipped with an agitator, 40 parts by weight of a macromer, which is a polymerization stabilizer, and 200 parts by weight of a base polyol, which has a molecular weight of 3,000 g/mol, an OHV of 56, and a viscosity of 500 cps, were added thereto, followed by stirring for 10 minutes. 300 parts by weight of ethylbenzene, which is an organic diluent, was further added to the reactor and completely dissolved. After the complete dissolution of the added material, the resulting mixture was stirred at a speed of 250 rpm, and the temperature of the reaction product was increased to 120° C. over an hour. Afterward, while the temperature was maintained for 1 hour, a styrene monomer was polymerized to prepare a soluble seed. The produced polystyrene was dissolved in the high-temperature ethylbenzene and polyol, so the reaction product was maintained in a transparent state. In addition, after 1-hour reaction, a portion of the sample was collected, and it was confirmed that the polystyrene was dissolved in the form of a polymer chain by confirming the increase in turbidity during cooling to room temperature.

(2) Polymerization of Polymer Polyol

After the preparation of a soluble seed, 11.1 parts by weight of azobisisobutyronitrile, which is a polymerization initiator, was mixed to 777 parts by weight of styrene, which is a polymerizable unsaturated monomer, and 333 parts by weight of acrylonitrile and completely dissolved, and then put into a continuous addition tank with 560 parts by weight of the base polymer, stirred for 5 minutes, and then continuously input to the soluble seed-containing reactor for 5 hours. The temperature and stirring condition of the reactor were maintained equal to those in the polymerization of the soluble seed. After inputting, the temperature was increased to 130° C., and aging was performed for 2 hours.

(3) Particulation of Polystyrene Polymer

The polymerization product was transferred to a purification tank, depressurized at 120° C. for 20 hours, and the ethylbenzene dissolved in the polymerization product was removed by degassing, thereby obtaining a polymer polyol.

Example 2

A polymer polyol was prepared in the same manner as in Example 1, except that ethylbenzene was changed into toluene as an organic diluent.

Example 3

A polymer polyol was prepared in the same manner as in Example 1, except that the amount of a styrene monomer input in the preparation of a soluble seed was changed from 90 parts by weight to 60 parts by weight.

Example 4

A polymer polyol was prepared in the same manner as in Example 1, except that a base polyol was changed into one that has a molecular weight of 5,000 g/mol and an OHV of 34.

Example 5

A polymer polyol was prepared in the same manner as in Example 1, except that the input amount of ethylbenzene as an organic diluent was changed from 300 parts by weight to 400 parts by weight.

Comparative Example 1

A polymer polyol was prepared in the same manner as in Example 1, except that 90 parts by weight of styrene, which is a monomer, input in the preparation of a soluble seed was changed into a mixture of 63 parts by weight of styrene and 27 parts by weight of acrylonitrile, such that initial seed particles became a SAN copolymer which was not dissolved in a mixed solvent of a base polyol and ethylbenzene.

Comparative Example 2

A polymer polyol was prepared in the same manner as in Example 1, except that ethylbenzene as an organic diluent was changed into isopropyl alcohol, which is a solvent incompatible with polystyrene.

Comparative Example 3

A polymer polyol was prepared in the same manner as in Example 1, except that the input of 777 parts by weight of styrene and 333 parts by weight of acrylonitrile in (2) was changed into the single input of 1,110 parts by weight of styrene.

The results of the preparation of the polymer polyols of Examples 1 to 5 and Comparative Examples 1 to 3 are shown in Table 1 below.

TABLE 1

| Classification | Organic diluent | Input amount of organic diluent (part by weight) | Seed monomer | Input amount of seed monomer (part by weight) | Continuously-added monomer | Molecular weight of base polyol (g/mol) | Appearance | Content of solid content in final product (%) | Viscosity (cps) |
|---|---|---|---|---|---|---|---|---|---|
| Example 1 | EB | 300 | SM | 90 | SM/AN | 3,000 | Find | 60.3 | 34,000 |
| Example 2 | TOL | 300 | SM | 90 | SM/AN | 3,000 | Find | 60.2 | 31,000 |
| Example 3 | EB | 300 | SM | 60 | SM/AN | 3,000 | Find | 60.4 | 36,000 |
| Example 4 | EB | 300 | SM | 90 | SM/AN | 5,000 | Find | 60.2 | 52,000 |
| Example 5 | EB | 400 | SM | 90 | SM/AN | 5,000 | Find | 60.2 | 36,000 |
| Comparative Example 1 | EB | 300 | SM/AN | 90 | SM/AN | 3,000 | Aggregated | Not assessable | Not assessable |
| Comparative Example 2 | IPA | 300 | SM | 90 | SM/AN | 3,000 | Aggregated | Not assessable | Not assessable |
| Comparative Example 3 | EB | 300 | SM | 90 | SM | 3,000 | Aggregated | Not assessable | Not assessable |

Referring to Table 1, in Examples 1 to 5 in which a soluble seed was formed by homopolymerization of styrene, and a polystyrene-soluble solvent was used as an organic diluent, a polymer polyol having a content of non-aggregated solid contents of 60% or more was able to be prepared.

In contrast, in Comparative Example 1, aggregation occurred by using an insoluble SAN copolymer seed prepared by polymerizing styrene and acrylonitrile. In Comparative Example 2 using isopropyl alcohol incompatible with polystyrene as an organic diluent, the seed was not dissolved and thus aggregation occurred. In Comparative Example 3, the polymer polyol was prepared by homopolymerization of styrene, and aggregation occurred.

It should be understood by those of ordinary skill in the art that the above description of the specification is exemplary, and the exemplary embodiments disclosed herein can be easily modified into other specific forms without departing from the technical spirit or essential features of the specification. Therefore, the exemplary embodiments described above should be interpreted as illustrative in all aspects and not restrictive. For example, each component described as a single unit may be implemented in a distributed manner, and components described as being distributed may also be implemented in combined form.

The scope of the specification is represented by the following claims, and all changes or modifications derived from the meaning and scope of the claims and their equivalent concepts should be interpreted as being included in the scope of the specification.

The invention claimed is:

1. A method of preparing a polymer polyol, comprising:

(a) polymerizing an aromatic vinyl monomer in the presence of an organic diluent and a polyol, thereby obtaining a dissolved homopolymer seed in the form of an aromatic vinyl polymer, wherein the organic diluent is compatible with an aromatic vinyl polymer such that the homopolymer seed is dissolved;

(b) additionally inputting the polyol, the aromatic vinyl monomer, and an unsaturated nitrile monomer to the product of (a) and performing polymerization; and (c) removing the organic diluent from the product of (b).

2. The method of claim 1, wherein the organic diluent is at least one selected from the group consisting of n-octane, n-dodecane, cyclohexane, methylcyclohexane, benzene, toluene, naphthalene, styrene, o-xylene, ethylbenzene, p-diethylbenzene, chloromethane, methylenechloride, 1,1-dichloroethylene, ethylenedichloride, chloroform, 1,1-dichloroethane, trichloroethylene, carbontetrachloride, chlorobenzene, o-dichlorobenzene, tetrahydrofuran, 1,4-dioxane, dibenzylether, acetone, methylethylketone, cyclohexanone, diethylketone, acetophenone, methylisobutylketone, methylisoamylketone, isophorone, diisobutylketone, methylacetate, ethylformate, propylene-1,2-carbonate, ethylacetate, diethylcarbonate, n-butylacetate, 2-ethoxyethyl acetate, isoamylacetate, 2-nitropropane, nitrobenzene, pyridine, morpholine, aniline, N-methyl-2-pyrrolidone, cyclohexylamine, quinoline, N,N-dimethylformamide, carbon disulfide, dimethyl sulfoxide, ethane thiol, ethanol, allyl alcohol, 1-propanol, 2-propanol, 1-butanol, 2-butanol, benzyl alcohol, cyclohexanol, diacetone alcohol, ethylene glycol monoethyl ether, diethylene glycol monomethyl ether, diethylene glycol monoethyl ether, ethylene glycol monobutyl ether, diethylene glycol monobutyl ether, 1-decanol, benzoic acid, stearic acid, phenol, resorcinol, m-cresol, methyl salicylate, ethylene glycol, glycerol, and propylene glycol.

3. The method of claim 1, wherein the polyol has a weight average molecular weight of 1,000 to 6,000 g/mol.

4. The method of claim 1, wherein the polyol has a hydroxyl value (OHV) of 30 to 60 mgKOH/g.

5. The method of claim 1, wherein the aromatic vinyl monomer is at least one selected from the group consisting of styrene, a-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl) styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexyl naphthalene, 1-vinylnaphthalene, divinylnaphthalene, divinylbenzene, trivinylbenzene, vinylbenzyldimethylamine, (4-vinylbenzyl) dimethylaminoethylether, vinylpyridine, vinylxylene, diphenylethylene, and halogenated styrene.

6. The method of claim 1, wherein the unsaturated nitrile monomer is at least one selected from the group consisting of acrylonitrile, methacrylonitrile, ethacrylonitrile, phenylacrylonitrile, and a-chloroacrylonitrile.

7. The method of claim 1, wherein, in (a), the weight ratio of the polyol and the aromatic vinyl monomer is 100:25 to 50.

8. The method of claim 1, wherein, in (a), the weight ratio of the organic diluent and the aromatic vinyl monomer is 100:15 to 120.

9. The method of claim 1, wherein the weight ratio of the polyol of (a) and the polyol additionally input in (b) is 100:100 to 500.

10. The method of claim 1, wherein the weight ratio of the aromatic vinyl monomer of (a) and the total sum of the monomers additionally input in (b) is 100:100 to 1,500.

11. The method of claim 1, wherein a content of solid contents in the prepared polymer polyol is 55 wt % or more, and a viscosity at 25° C. is 15,000 to 55,000 cps.

12. The method of claim 1, wherein (a) to (c) are performed by a one-pot process.

* * * * *